US 6,726,230 B2

(12) United States Patent
Weir

(10) Patent No.: US 6,726,230 B2
(45) Date of Patent: Apr. 27, 2004

(54) AUTOMOTIVE SIDE BAR

(76) Inventor: Dennis E. Weir, 12424 N. 56th Dr., Glendale, AZ (US) 85304

( * ) Notice: Subject to any disclaimer, the term of this patent is extended or adjusted under 35 U.S.C. 154(b) by 14 days.

(21) Appl. No.: 10/160,544

(22) Filed: May 30, 2002

(65) Prior Publication Data

US 2003/0222423 A1 Dec. 4, 2003

(51) Int. Cl.[7] ................................ B60R 3/00
(52) U.S. Cl. ........................ 280/163; 280/770
(58) Field of Search ............... 280/163, 164.1, 280/164.2, 165, 166, 169, 762, 770, 765.1; 16/DIG. 41; 403/286, 300, 285, 301, 302, 305, 341; 411/104, 85, 84; 182/92, 112, 127; 296/71

(56) References Cited

U.S. PATENT DOCUMENTS

| | | | | |
|---|---|---|---|---|
| 104,884 A | * | 6/1870 | Reinshagen | 403/286 |
| 637,000 A | * | 11/1899 | Johnson | 403/300 |
| 1,189,802 A | * | 7/1916 | Eckert | 403/301 |
| 1,240,582 A | * | 9/1917 | Kirsch | 403/300 |
| 2,367,206 A | * | 1/1945 | Davis | 403/285 |
| 3,811,786 A | * | 5/1974 | Valle | 403/300 |
| 4,935,638 A | * | 6/1990 | Straka | 280/164.1 |
| 4,943,085 A | * | 7/1990 | Straka | 280/770 |
| D320,592 S | * | 10/1991 | Straka | D12/190 |
| 5,193,829 A | * | 3/1993 | Holloway et al. | 280/163 |
| 5,713,589 A | * | 2/1998 | Delgado et al. | 280/163 |
| 6,435,534 B1 | * | 8/2002 | Stone | 280/163 |
| 6,581,946 B2 | * | 6/2003 | Lund et al. | 280/163 |
| 6,588,783 B2 | * | 7/2003 | Fichter | 280/169 |

FOREIGN PATENT DOCUMENTS

WO  WO 91/05678  *  5/1991  ............. 280/163

* cited by examiner

Primary Examiner—Brian L. Johnson
Assistant Examiner—Hau Phan
(74) Attorney, Agent, or Firm—Cahill, Sutton & Thomas P.L.C.

(57) ABSTRACT

A side bar incorporates brackets for attachment to a vehicle; the bar is divided into sections to permit the side bar to be economically packaged for shipment. The side bar sections are secured to each other through the use of a support rail mounted internally of the side bar sections and extending across the joint formed by the abutting contact of the respective sections. The side bar sections are maintained in alignment through the use of a joint sleeve having an alignment pin that engages corresponding notches provided in the ends of each of the abutting sections.

13 Claims, 2 Drawing Sheets

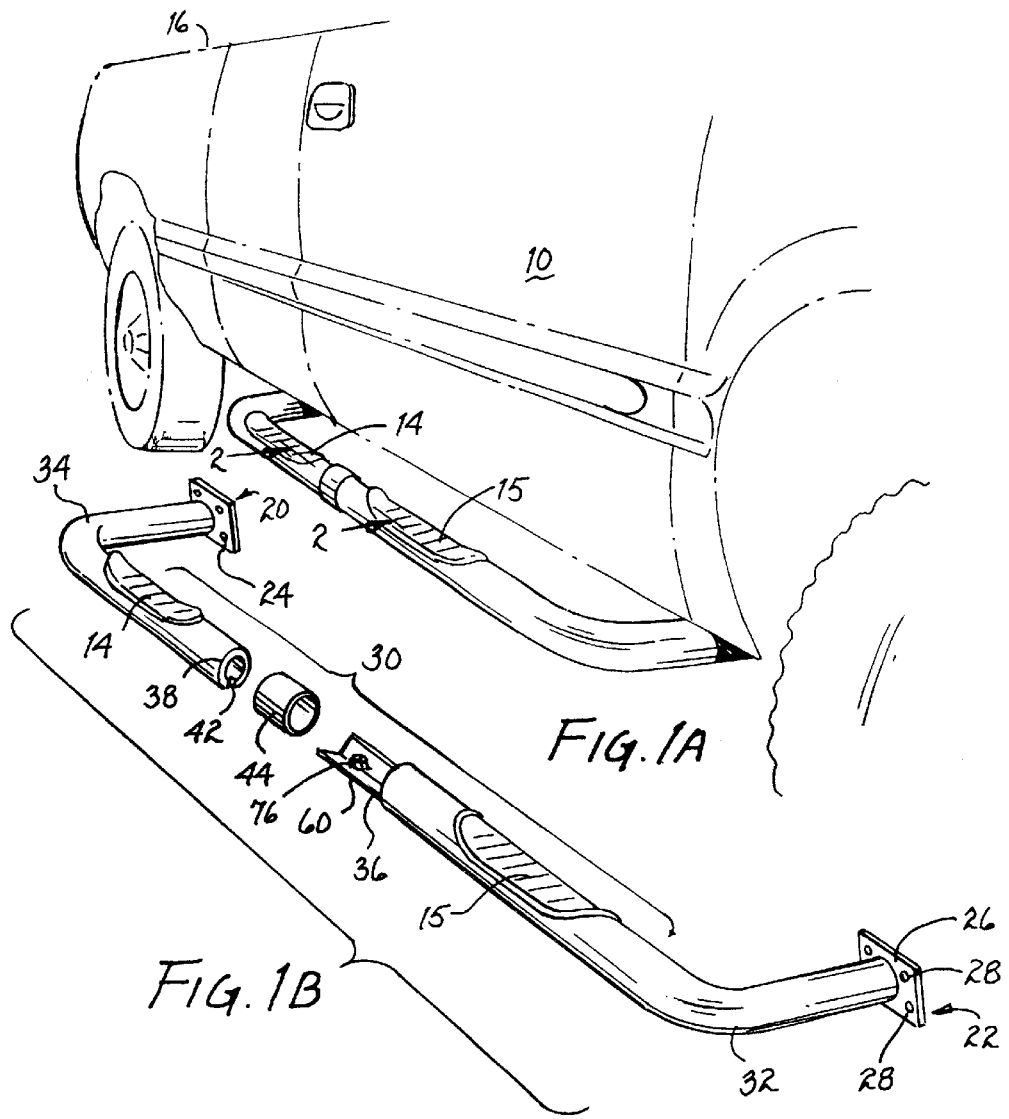
Fig. 1A
Fig. 1B
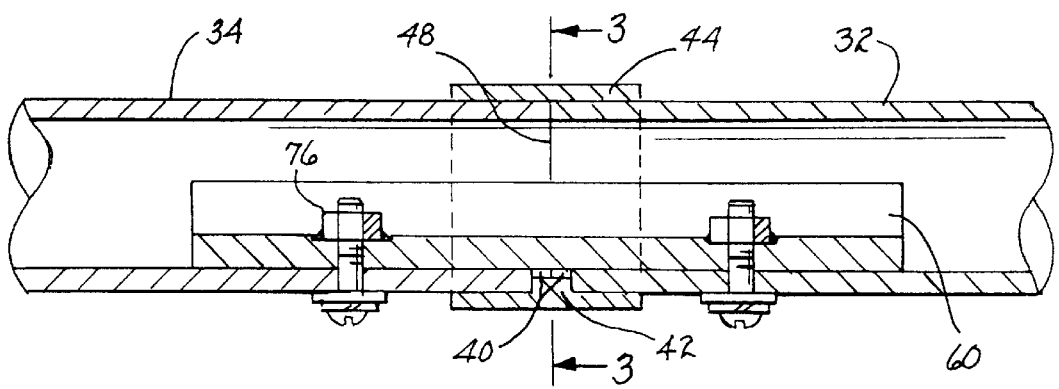
Fig. 2

AUTOMOTIVE SIDE BAR

FILED OF THE INVENTION

The present invention relates to automotive accessory equipment, and specifically, to automotive side bars or Nerf bars.

BACKGROUND OF THE INVENTION

Modern pick-up trucks, sport utility vehicles, and other vehicles that are designed with door sills that are positioned relatively high from the ground are sometimes uncomfortably high for persons entering the vehicle. Since vehicles generally no longer include running boards or the like, it is frequently desirable to employ an accessory device that provides an intermediate step for a prospective occupant of the vehicle to use when mounting or dismounting the vehicle.

It has therefore become common for owners of such vehicles to attach an accessory product known in the industry as a side bar. These side bars are sometimes built sufficiently strong to provide protection to the door sills of the vehicle when such vehicles are used for rugged terrain off-road use. However, the more common usage of such side bars is to provide a step to assist an occupant when entering or leaving the vehicle. Frequently, such side bars are employed primarily as a decorative additive to be mounted on the vehicle to enhance the latter's appearance.

Such side bars are usually produced to fit a specific vehicle such that the side bar will extend from some position forward of the front door of the vehicle to a position aft of the rear door of the vehicle; similarly sometimes the side bars extend rearwardly of the vehicle to permit the bar to be used as a step to access the bed of a pick-up truck. The side bars are therefore bulky items and when shipped to a vehicle owner or purchaser, the shipping charges attendant the long awkward length of the bar renders the shipping costs substantial. That is, shippers normally charge in accordance with a combination of weight, length, and width of a product being shipped. When the product is extraordinarily long, as in the case of Nerf bars, the shipping charges may be significantly increased as a result of penalties added because of the bar's length.

OBJECTS OF THE INVENTION

It is therefore an object of the present invention to provide a side bar that can be economically shipped from a point of origin to a site of distribution or purchaser.

It is still another object of the present invention to provide a side bar that may conveniently be packaged in a more economical manner while providing convenient assembly by the purchaser.

It is still another object of the present invention to provide a side bar that is divided into sections, each of which may be conveniently oriented with respect to adjacent sections and all of which may be conveniently joined to provide a unitary structure.

These and other objects of the present invention will become apparent to those skilled in the art as the description thereof proceeds.

SUMMARY OF THE INVENTION

The present invention comprises a side bar that is divided into sections to permit the bar to be packaged in a convenient manner for economical shipment. When the bar arrives at its point of use, the sections are conveniently assembled through the utilization of a support rail mounted within the tubular side bar together with fasteners provided for securing the sections together. An alignment notch is provided in each section that registers with an alignment pin provided in the interior of a joint sleeve to permit the sections of the bar to be aligned to insure proper orientation of the sections with respect to each other and to facilitate mounting of the bar to a vehicle.

BRIEF DESCRIPTION OF THE DRAWINGS

FIG. 1A is a perspective view showing the side of a vehicle having a side bar constructed in accordance with the teachings of the present invention attached thereto;

FIG. 1B is an enlarged exploded view of the side bar of FIG. 1A;

FIG. 2 is a cross-sectional view of the side bar of FIG. 1A taken along line 2—2;

DETAILED DESCRIPTION OF THE PREFERRED EMBODIMENTS

Figure 6:
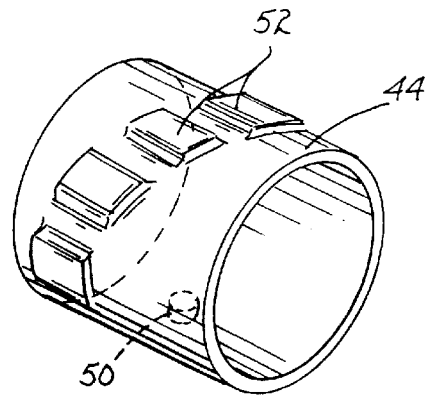
FIG. 6 is a perspective view of the joint sleeve of the side bar shown in FIG. 1A.

Referring now to FIG. 1A, a vehicle 10 is shown to which the side bar 12 of the present invention has been mounted. The side bar 12 extends from beneath the vehicle 10 (where it has been secured through the use of brackets) outwardly from the side of the vehicle and along the side of the vehicle parallel to the vehicle side. The side bar may be formed in any convenient manner, but is typically constructed of rigid tubular material such as tubular steel that will conventionally be chrome plated. The bar incorporates steps 14 and 15 that are generally positioned along the side of the vehicle where it is likely that an occupant will place his foot while entering or leaving the vehicle. In the embodiment shown in FIG. 1A, the vehicle is a pick-up truck wherein it may be seen that step 14 is positioned to facilitate either the entrance to or the examination of the bed 16 of the pick-up truck while step 15 is positioned adjacent the door 18 of the pick-up to permit a prospective occupant to place his foot on the step 15 and enter the vehicle.

The steps 14 and 15 are usually formed by providing a flat portion of the tubular side bar and covering the flattened portion with a rigid plastic or rigid rubberized cover that may incorporate a tread design to help stabilize the footing of the occupant as he places his foot on the step. The flattened portions of the side bar that are adapted to receive the plastic or rubberized steps may be formed in any well known prior art manner. For example, that portion of the side bar tube that is to receive the step may be stamped to collapse the tubing and may be provided with means for receiving mounting screws (not shown) to secure the step covers thereto in a manner well known in the prior art.

Referring now to FIG. 1B, the side bar of FIG. 1A is shown in an enlarged and exploded view. It may be seen that the tubular side bar is provided with mounting brackets 20 and 22 at either end thereof for attachment to the vehicle.

The mounting brackets will usually comprise flat plates 24 and 26, respectively, welded or otherwise secured to the ends of the tubular side bar and be of such shape and dimension to provide secure contact with the frame, or other supporting structure, of the vehicle. Normally these mounting brackets are provided with a plurality of holes 28 to accept bolts for attachment to the vehicle frame. The tubular bar forming the side bar 12 extends from the respective mounting brackets and is bent at a 90° angle to form a straight section 30 running parallel to the side of the vehicle. The respective steps 14 and 15 are positioned as described above in connection with FIG. 1A. The overall length of the side bar is therefore determined by the respective vehicle with which it is intended to be used and is also determined by the availability of attachment points for the mounting brackets. As described above in connection with the background of the invention, the length of the side bar in comparison to its widest dimension and weight renders the shipment of side bars expensive. That is, the length of the side bars is such that a penalty is imposed by shipping organizations. To avoid payment of such shipping costs, the present invention is shipped in sections. In the embodiment chosen for illustration, the side bar is divided into two sections, a front section 32 and rear section 34. The two sections may each contain one or more steps and are positioned and mounted in a conventional manner when the sections have been joined. The sections are joined at the abutting ends 36 and 38 of the sections 32 and 34, respectively, and are aligned through the utilization of alignment notches 40 and 42, respectively, provided in each of the sections at the abutting ends thereof. A joint sleeve 44 is provided that is sized to closely slide over the exterior of the respective sections and cover the joint between the sections. In the embodiment chosen for illustration, the alignment notches are semicircular.

Referring now to FIGS. 2 through 6, the joint 48 between the front and rear sections 32 and 34 is formed by the ends of the respective sections, each of which includes an alignment notch 40 and 42, respectively. In the embodiment chosen for illustration the notches are semicircular; however, other configurations may be used and plural notches may be used. The respective notches of the front and rear section are maintained in alignment through the utilization of an alignment pin 50 that is formed in the interior of the joint sleeve 44. The joint sleeve may be formed of any rigid material; however, rigid plastic material may conveniently be molded to have an internal alignment pin 50 that may be cylindrical in shape so that the diameter of the pin closely conforms to the slightly larger diameter of the semicircular notches provided in the ends of the respective side bar sections. As indicated previously, plural alignment pins may be used and the specific shape of the pins may vary depending on the shape chosen for the alignment notches provided in the ends of the respective side bar sections. The joint sleeve 44 may also be provided with molded ridges 52 as a decorative addition to the sleeve. Such decorative ridges may typically be formed in a manner similar to the tread patterns provided on the respective steps to enhance the overall appearance of the assembled side bar. Thus, the joint sleeve 44, when in its mounted position, covers the joint between the respective side bar sections and presents a decorative exterior; further, the bar provides the alignment pin 50 to facilitate the alignment of the adjacent side bar sections by contacting the respective notches 40 and 42 provided in the sections.

The front and rear sections 32 and 34 of the side bar, having been aligned through the utilization of the joint sleeve 44 and specifically the alignment pin 50 of the joint sleeve nesting within the opposing alignment notches 40 and 42 of the front and rear sections, may now be secured in this aligned position. When the sections of the side bar have thus been aligned with the respective ends in abutting contact with each other, the sections are secured to form a unitary structure through the utilization of a support rail 60 mounted within the opposing sections of the tubular side bar. The support rail 60 is preferably of a "V" cross-sectional shape that extends across the joint 48 between the side bar sections and incorporates legs 62 and 64 that extend approximately 90° with respect to each other from the apex 66 of the cross-sectional configuration. These legs contact the interior wall 68 of the tubular side bar. A convenient means for securing the tubular side bar sections and support rail in place may be support rail fasteners such as bolts or machine screws 70 extending through holes 72 provided in the side bar sections and through holes 74 provided therefore in the support rail into locking engagement with nuts 76 that are welded in place to the support rail. As may be clearly seen in FIG. 3, when the bolt is tightened, it draws the support rail downwardly causing intimate and firm contact between the respective edges 78 of the legs of the V-shaped rail and the interior surfaces of the respective side bar sections. The tightening of the fasteners or bolts results in a side bar joint that is extremely rigid and strong while maintaining alignment between the sections.

Figure 3:
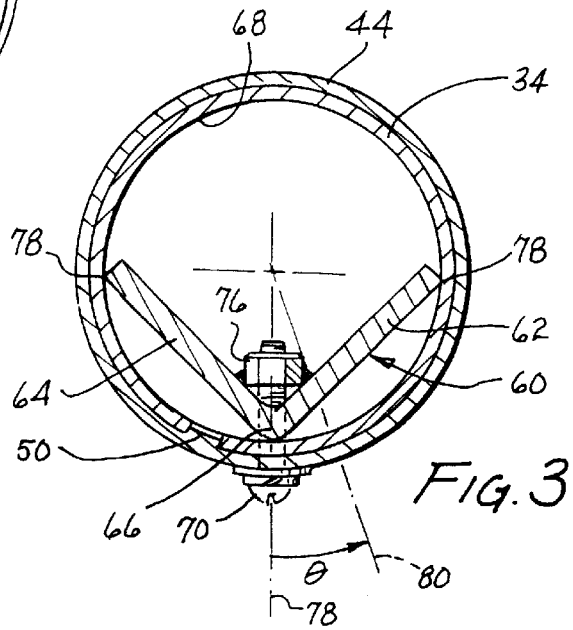
FIG. 3 is a cross-sectional view of the side bar of FIG. 2 taken along line 3—3.
Figure 4:
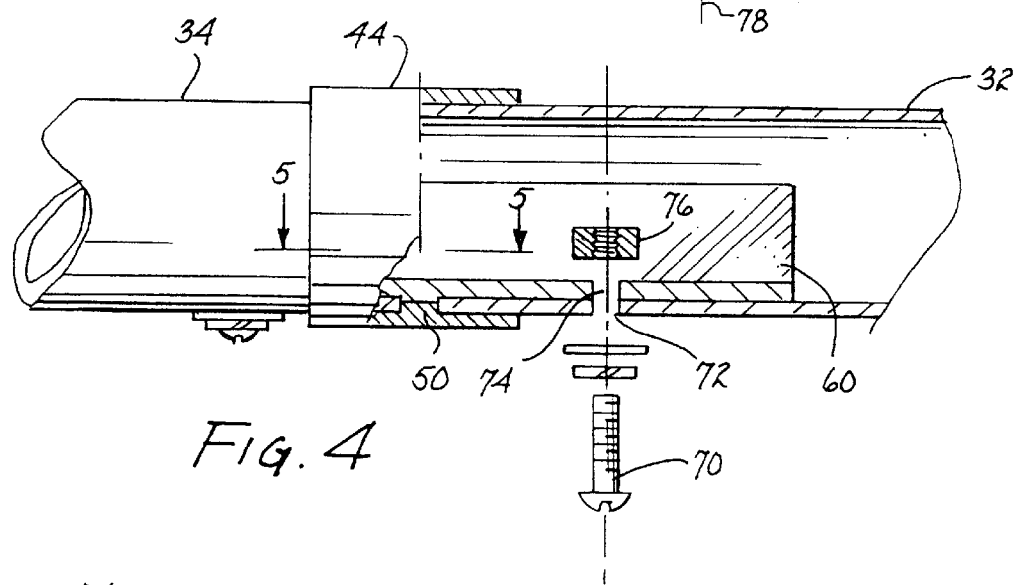
FIG. 4 is a side elevational view of a portion of the side bar of FIG. 1, partly in section, showing the joint between adjacent sections of the side bar.
Figure 5:
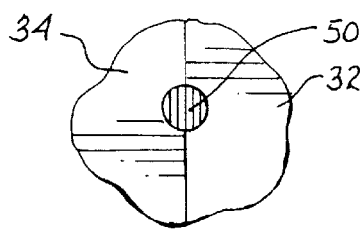
FIG. 5 is a cross-sectional view of a portion of FIG. 4 taken along line 5—5.

As shown in FIG. 3, the axis 78 of the bolts may be positioned along an alternate axis 80 having offset angle θ from vertical so that the bolt heads are positioned closer to the vehicle when the side bar is mounted to make the bolts less visible to users or viewers of the installed side bar. The support rail preferably incorporates a "V" cross-section as shown and described above. However, other cross-sectional configurations for the support rail may be used. For example, the cross-sectional configuration could be a "U" shape with the legs of the "U" spread outwardly to contact the interior walls of the tubular side bar in a manner similar to that shown in the preferred embodiment.

When the side bar is shipped in its disassembled condition, the maximum length of the resulting package is approximately only one half the length of the assembled side bar. Therefore, the shipping package is more efficiently constructed and penalties for shipping package length are no longer encountered. When the disassembled side bar is received, the joint sleeve 44 is positioned on one of the side bar sections by sliding the sleeve over the end of the section until the alignment pin 50 engages and nests within the corresponding alignment notch 40 or 42. The second side bar section, with the support rail attached thereto and extending outwardly from the end of the section is then slid into the open end of the joint sleeve 44 until the alignment notch therein abuts the alignment pin of the sleeve. In this latter position, the sections are aligned with their respective notches engaging the alignment pin of the sleeve and with their ends abutting. The bolts or machine screws 70 are then tightened to draw the edges of the legs of the V-shaped rail into contact with the interior surfaces of the respective sections. The side bar may then be mounted on the vehicle in conventional manner by attaching the mounting brackets to the appropriate locations on the vehicle. The resulting structure is a unitary side bar structure having a joint sleeve covering the joint between the respective sections of the side bar with the support rail firmly and rigidly connecting the two sections and providing both bending and torsional strength to the side bar at the joint. The fasteners such as the machine screws or bolts 70 are out of the direct line of site of the observer since they are positioned on the bottom of the side bar aimed slightly toward the vehicle in a hidden position. The installed side bar therefore appears to be the same as a one piece side bar with comparable strength and rigidity but at a lower cost as a result of savings in shipping costs.

The present invention has been described in terms of selected specific embodiments of the apparatus and method incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiments chosen for illustration without departing from the spirit and scope of the invention.

What is claimed is:

1. In an automotive side bar constructed of rigid tubular material and adapted to be secured to an automotive vehicle, the improvement comprising:
   (a) a plurality of abutting adjacent sections;
   (b) each section having a joint end for positioning opposite a joint end of an adjacent section, each joint end having an alignment notch therein, said joint ends forming a joint between adjacent sections; and
   (c) a joint sleeve having an alignment pin, said sleeve extending over the joint between said adjacent sections with said alignment pin positioned in the alignment notches of the respective sections.

2. The side bar set forth in claim 1 including a support rail removably attached to said sections and extending across said joint.

3. The side bar set forth in claim 2 wherein said support rail incorporates a V-shaped cross-section with the legs of the "V" contacting interior surfaces of said sections on either side of said joint.

4. The side bar set forth in claim 1 wherein at least two of said sections each include mounting brackets secured to one end thereof, respectively, for attachment to a vehicle.

5. The side bar set forth in claim 1 wherein at least the of said sections includes a step portion having a flattened surface for conveniently receiving the foot of a mounting or dismounting passenger.

6. In an automotive side bar constructed of rigid tubular material and adapted to be secured to an automotive vehicle, the improvement comprising:
   (a) a plurality of abutting adjacent sections;
   (b) each section having a joint end for positioning opposite a joint end of an adjacent section, said joint ends forming a joint between adjacent sections;
   (c) a support rail positioned within said sections and extending across said joint;
   (d) said support rail fastened to each section adjacent said joint; and
   (e) said support rail incorporating a V-shaped cross-section with the legs of the "V" contacting interior surfaces of said sections on either side of said joint.

7. The side bar set forth in claim 6 wherein at least two of said sections each include mounting brackets secured to one end thereof respectively, for attachment to a vehicle.

8. The side bar set forth in claim 6 wherein at least one of said sections includes a step portion having a flattened surface for conveniently receiving the foot of a mounting or dismounting passenger.

9. In an automotive side bar constructed of rigid tubular material and adapted to be secured to an automotive vehicle, the improvement comprising:
   (a) a plurality of abutting adjacent sections;
   (b) each section having a joint end for positioning opposite a joint end of an adjacent section, each joint end having an alignment notch therein, said joint ends forming a joint between adjacent sections;
   (c) a joint sleeve having an alignment pin, said sleeve extending over the joint between said adjacent sections with said alignment pin positioned in the alignment notches of the respective sections; and
   (d) a support rail mounted within said side bar and extending across said joint and fastened to each of said abutting adjacent sections adjacent said joint.

10. The side bar set forth in claim 9 wherein said support rail is formed having a V-shaped cross-section with the legs of the "V" contacting interior surfaces of said sections on either side of said joint.

11. The side bar set forth in claim 9 wherein said support rail incorporates a U-shaped cross-section with the legs of the "U" contacting interior surfaces of said sections on either side of said joint.

12. The side bar set forth in claim 9 wherein at least two of said sections each include mounting brackets secured to one end thereof respectively for attachment to a vehicle.

13. The side bar set forth in claim 9 wherein at least one of said sections includes a step portion having a flattened surface for conveniently receiving the foot of a mounting or dismounting passenger.

* * * * *